(12) United States Patent
Arikere et al.

(10) Patent No.: US 11,981,214 B2
(45) Date of Patent: May 14, 2024

(54) VEHICLE MOTION MANAGEMENT SYSTEM AND AN ACTUATOR CONTROL SYSTEM FOR A VEHICLE

(71) Applicant: Volvo Truck Corporation, Gothenburg (SE)

(72) Inventors: Adithya Arikere, Gothenburg (SE); Leon Henderson, Härryda (SE); Leo Laine, Härryda (SE); Ray Sidhant, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 162 days.

(21) Appl. No.: 17/521,935

(22) Filed: Nov. 9, 2021

(65) Prior Publication Data
US 2022/0153146 A1 May 19, 2022

(30) Foreign Application Priority Data
Nov. 16, 2020 (EP) .................................... 20207778

(51) Int. Cl.
*B60L 15/20* (2006.01)
(52) U.S. Cl.
CPC ......... *B60L 15/20* (2013.01); *B60L 2240/461* (2013.01); *B60L 2240/463* (2013.01); *B60L 2240/465* (2013.01); *B60L 2260/28* (2013.01)
(58) Field of Classification Search
None
See application file for complete search history.

(56) References Cited

U.S. PATENT DOCUMENTS

| | | | |
|---|---|---|---|
| 8,718,897 B2 * | 5/2014 | Wright | B60L 15/32 |
| | | | 701/91 |
| 2003/0144777 A1 | 7/2003 | Schmitt | |
| 2010/0114447 A1 | 5/2010 | Moriki et al. | |
| 2016/0039312 A1 | 2/2016 | Kato | |

FOREIGN PATENT DOCUMENTS

| | | |
|---|---|---|
| CN | 108422901 B | 11/2019 |
| CN | 108394313 B | 4/2020 |
| WO | 2017215751 A1 | 12/2017 |

OTHER PUBLICATIONS

Pacejka, H., "Tire and vehicle dynamics," 2012, Elsevier Ltd., 629 pages.
Extended European Search Report for European Patent Application No. 20207778.0, dated May 7, 2021, 8 pages.

* cited by examiner

*Primary Examiner* — Todd Melton
(74) *Attorney, Agent, or Firm* — Withrow & Terranova, PLLC (57) ABSTRACT

The present disclosure relates to a vehicle motion management system as well as an actuator control system of a vehicle. The vehicle motion management system and actuator control system are arranged to control operation of at least one actuator configured to apply a torque to at least one wheel of the vehicle. The vehicle motion management system is configured to transmit a control signal to the actuator control system, wherein the actuator control system is configured to, based on the control signal, generate an operating torque to be executed subject to the torque limit and the desired wheel speed.

14 Claims, 4 Drawing Sheets

VEHICLE MOTION MANAGEMENT SYSTEM AND AN ACTUATOR CONTROL SYSTEM FOR A VEHICLE

RELATED APPLICATION

The present application claims priority to European Patent Application No. 20207778.0, filed on Nov. 16, 2020, and entitled "VEHICLE MOTION MANAGEMENT SYSTEM AND AN ACTUATOR CONTROL SYSTEM FOR A VEHICLE," which is incorporated herein by reference in its entirety.

TECHNICAL FIELD

The present disclosure relates to a vehicle motion management system and an actuator control system for a vehicle. The present disclosure also relates to a method as well as a control signal operable by the vehicle motion management system and the actuator control system. The present disclosure is applicable to electrically propelled vehicles. Although the disclosure will mainly be directed to a vehicle in the form of a truck using electric machines for propulsion, it may also be applicable for other types of vehicles.

BACKGROUND

In the field of vehicle, in particularly low-, medium- and heavy-duty vehicles commonly referred to as trucks, there is a continuous development with regards to various control functionalities of the vehicle. In particular, the control functionalities intend to improve the drivability of the vehicle, the comfort for the driver, and the safety during operation.

SUMMARY

It is thus an object of the present disclosure to at least partially overcome the above described deficiencies.

According to a first aspect, there is provided a vehicle motion management system for a vehicle, the vehicle motion management system being connectable to an actuator control system for communication of control signals therebetween, wherein the vehicle motion management system is configured to obtain a parameter value relating to a desired wheel force of at least one wheel of the vehicle; determine a torque limit for the at least one wheel based on the parameter value relating to the desired wheel force; determine a mapping model based on a relationship between wheel force and wheel speed of the at least one wheel; determine a parameter value relating to a desired wheel speed for the at least one wheel based on the mapping model; and transmit a control signal to the actuator control system, the control signal being arranged to, when executed by the actuator control system, cause the actuator control system to generate an operating torque to be executed subject to the torque limit and the desired wheel speed.

The vehicle motion management system and the actuator control system are control systems of the vehicle, where each of the control systems is arranged to execute various control functionalities for controlling operation of the vehicle, in particular for controlling wheel operations. The vehicle motion management system is preferably configured to receive, and to determine wheel parameters in a higher layer, i.e. the vehicle motion management system determines a desired torque and wheel slip limit, also referred to as tire slip limit, in a more generalized form, whereas the actuator control system is arranged as a lower layer control system configured to convert the parameters received from the vehicle motion management system to appropriate parameters for an actuator. The actuator control system takes e.g. current driveline state(s) into account before forwarding an actuator signal to the actuator. The current driveline state may, for example, relate to a current vehicle transmission state, such as a gear stage for the vehicle transmission or a transmission clutch actuation state.

The parameter value relating to a desired wheel force, also referred to as tire force, should be construed as both relating to a desired wheel force as well as a desired wheel torque. The desired wheel force/torque is thus obtained in the form of a force/torque demand signal. The parameter value relating to the desired wheel force can be based on a request from a vehicle operator, i.e. the accelerator pedal or brake pedal position, or be based on a force demand signal from a system autonomously controlling propulsion operation of the vehicle, or from an advanced driver assistance system (ADAS). The torque limit could be determined based on the desired wheel force in combination with a margin value. Thus, the torque limit is set as a value corresponding to the desired torque plus a predetermined safety margin. As an alternative, the torque limit could be based on a torque request from the vehicle operator.

Also, the parameter value relating to a desired wheel speed should be construed as also relatable to a desired wheel slip for the at least one wheel of the vehicle. Wheel slip is the relative longitudinal motion between the wheel of the vehicle and the ground surface thereof, i.e. the amount of "skidding", i.e., a difference between the wheel speed over ground and the actual wheel speed. The wheel slip can be determined as a relationship between the longitudinal speed of the wheel and the rotational speed of the wheel taking the wheel radius into account. Accordingly, wheel slip is a parameter value relating to the wheel speed, and is preferably defined in a wheel based coordinate system.

Furthermore, the mapping model, which according to an example embodiment, is based on a predetermined characteristic value of the at least one wheel, defines a relationship between wheel force and wheel speed. The wheel speed can be defined relative to the ground, and normalized, i.e. the wheel slip, or be defined as an absolute rotational velocity. Thus, when defining a mapping model, a wheel force value for a specific wheel speed value can be obtained.

The mapping model can be a fixed mapping model, and/or a mapping model comprising estimated characteristics of the relationship between the wheel forces and the wheel speeds. As another alternative, the mapping model could be parameterized based on other factors, such as normal load on the tire, type of tire, wear, friction, etc.

By defining and transmitting a control signal indicative of a torque limit, the vehicle can be operated in a torque limit based control mode as well as a speed based control mode depending on the actual road condition. Hereby, when controlling the actuator to generate an operating torque based on the desired wheel speed, the torque limit will not be exceeded. The mapping model could thus preferably be defined to correspond to a relatively slippery road condition, i.e. a wet asphalt road or an icy road. By setting such a mapping model, the actuator will be operated in a torque limit control mode when driving on e.g. a dry road, etc., as the applied torque will hit the torque limit. On the other hand, when operating the vehicle on e.g. a slippery road or a dry road with large steering input, i.e. high lateral acceleration, the torque limit will not be reached, and the actuator will be operated in a wheel speed control mode.

According to an example embodiment, the mapping model may be based on a relationship between wheel force and wheel speed for a predetermined wheel characteristic of the at least one wheel. As indicated above, the predetermined wheel characteristic could be, for example, wheel normal load, friction between the wheel and the ground surface, the specific type of tire, etc. Hereby, the mapping model could be modified based on various number of parameters.

According to an example embodiment, the mapping model may be based on a safety parameter indicative of a current operating condition of the vehicle. As indicated above, the mapping model could be based on a relatively slippery road condition. The safety parameter hereby enables the actuator to be mainly controlled in the torque limit control mode, and operated in the wheel speed control mode only when the road condition is "more slippery" than the safety parameter has taken into consideration.

According to an example embodiment, and as indicated above, the parameter relating to the desired wheel speed may be a desired wheel slip parameter.

According to an example embodiment, the torque limit may be determined independently from the determined mapping model. An advantage is that the mapping model can be based on e.g. a slippery road condition or any other factor described above, and the torque limit can be freely determined based on e.g. a desired driving experience, etc.

According to an example embodiment, the mapping model may be a first mapping model, the vehicle motion management system being configured to determine a second mapping model, the second mapping model is based on an increased wheel force compared to the first mapping model for respective wheel speeds.

According to an example embodiment, the torque limit may be a first torque limit, the vehicle motion management system being configured to determine a second torque limit relating to a desired wheel speed based on the second mapping model, wherein the transmitted control signal is arranged to, when executed by the actuator control system, cause the actuator control system to generate the operating torque to be executed subject to the desired wheel speed and the first and second torque limits.

Using a first and a second mapping model, a range can be defined where one mapping model represents e.g. a slippery road condition, while the other mapping model represents e.g. a road condition with relatively high friction between the surface of the wheel and the road surface. The applied torque will thus not exceed an upper torque limit and not fall below a lower torque limit.

According to an example embodiment, the first and second mapping models may be determined based on a predetermined range between wheel force values for a specific wheel speed.

The predetermined range may be based on a desired torque where a range is set based on this desired torque, i.e. an upper safety margin and a lower safety margin. In further detail, the upper torque limit may correspond to a desired torque plus a predetermined torque value, while the lower torque limit corresponds to the desired torque minus the predetermined torque value.

According to a second aspect, there is provided an actuator control system for a vehicle, the actuator control system being connectable to a vehicle motion management system and to at least one actuator configured to apply a torque on at least one wheel of the vehicle, wherein the actuator control system is configured to receive a control signal from the vehicle motion management system, the control signal being indicative of a torque limit and a parameter value relating to a desired wheel speed for the actuator; and transmit an actuator signal to the actuator for the actuator to generate an operating torque on the at least one wheel subject to the torque limit and the parameter value relating to the desired wheel speed.

The actuator control system of the second aspect thus receives the control signal described above in relation to the first aspect. An advantage of controlling the parameter relating to the wheel speed, such as the wheel slip, using the actuator control system is that the actuator control system is capable of rejecting rapid changing disturbances in the vehicle system. When, for example, operating the vehicle at a rough, bumpy road, the wheel slip can be kept within a substantially safe slip range. Effects of the second aspect are similar to the above description.

According to an example embodiment, the actuator signal may be configured to control the actuator to generate an operating torque without exceeding the torque limit. According to another example, the actuator signal may be configured to control the actuator to generate an operating torque above the lower torque limit described above in relation to the first aspect.

According to an example embodiment, the actuator control system may be configured to generate the operating torque based on a current vehicle driveline state for the vehicle.

The current driveline state should be construed as a current operating mode of the driveline, and in particular the transmission of the driveline. According to an example embodiment, the current vehicle driveline state may be one of a current vehicle transmission state, such as a gear stage for the vehicle transmission or a transmission clutch actuation state. Hereby, and as indicated above, the actuator control system is arranged as a lower layer control system configured to convert the parameters received from the vehicle motion management system to appropriate parameters for an actuator taking the current driveline state into consideration.

According to an example embodiment, the actuator control system may be a decentralized actuator control system connectable to a wheel specific actuator configured to control a single wheel of the vehicle.

Using a decentralized actuator control system enables for rapid response to the specific actuator it is connected to, which hence improves the operational propulsion/braking performance of the vehicle. The decentralized actuator control system can be connected to a separate vehicle motion management system, or connected to a central vehicle motion management system, which central vehicle motion management system is connected to a plurality of decentralized actuator control systems.

Further effects and features of the second aspect are largely analogous to those described above in relation to the first aspect.

According to a third aspect, there is provided a method for controlling an actuator of a vehicle, the actuator being configured to apply a torque on at least one wheel of the vehicle, wherein the method comprises: determining a parameter value relating to a desired wheel force of at least one wheel of the vehicle; determining a torque limit for the at least one wheel based on the parameter value relating to the desired wheel force; determining a mapping model based on a relationship between wheel force and wheel speed of the at least one wheel; determine a parameter value relating to a desired wheel speed for the at least one wheel based on the mapping model; and controlling the actuator to generate an operating torque on the at least one wheel subject to the torque limit and the parameter value relating to the desired wheel speed.

The various operations executed by the method of the third aspect should not be construed as limited to necessarily be executed by a specific one of the above described vehicle motion management system or actuator control system. Conversely, the operations can be executed by either the vehicle motion management system or the actuator control system unless stated otherwise.

According to a fourth aspect, there is provided a control signal representing instructions to be executed by an actuator control system of a vehicle, the control signal comprising a wheel speed component representing instructions which, when executed by the actuator control system, cause the actuator control system to generate a parameter value associated with a desired wheel speed for a wheel of the vehicle; and a torque limit component representing instructions which, when executed by the actuator control system, cause the actuator control system to generate a maximum allowable torque limit for the wheel of the vehicle; wherein the actuator control system is adapted to execute an operating torque subject to the desired wheel speed and the maximum allowable torque limit.

According to a fifth aspect, there is provided a computer program comprising program code means for performing the steps of the third aspect when the program is run on a computer.

According to a sixth aspect, there is provided a computer readable medium carrying a computer program comprising program means for performing the steps of the third aspect when the program means is run on a computer.

Effects and features of the third, fourth, fifth, and sixth aspects are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
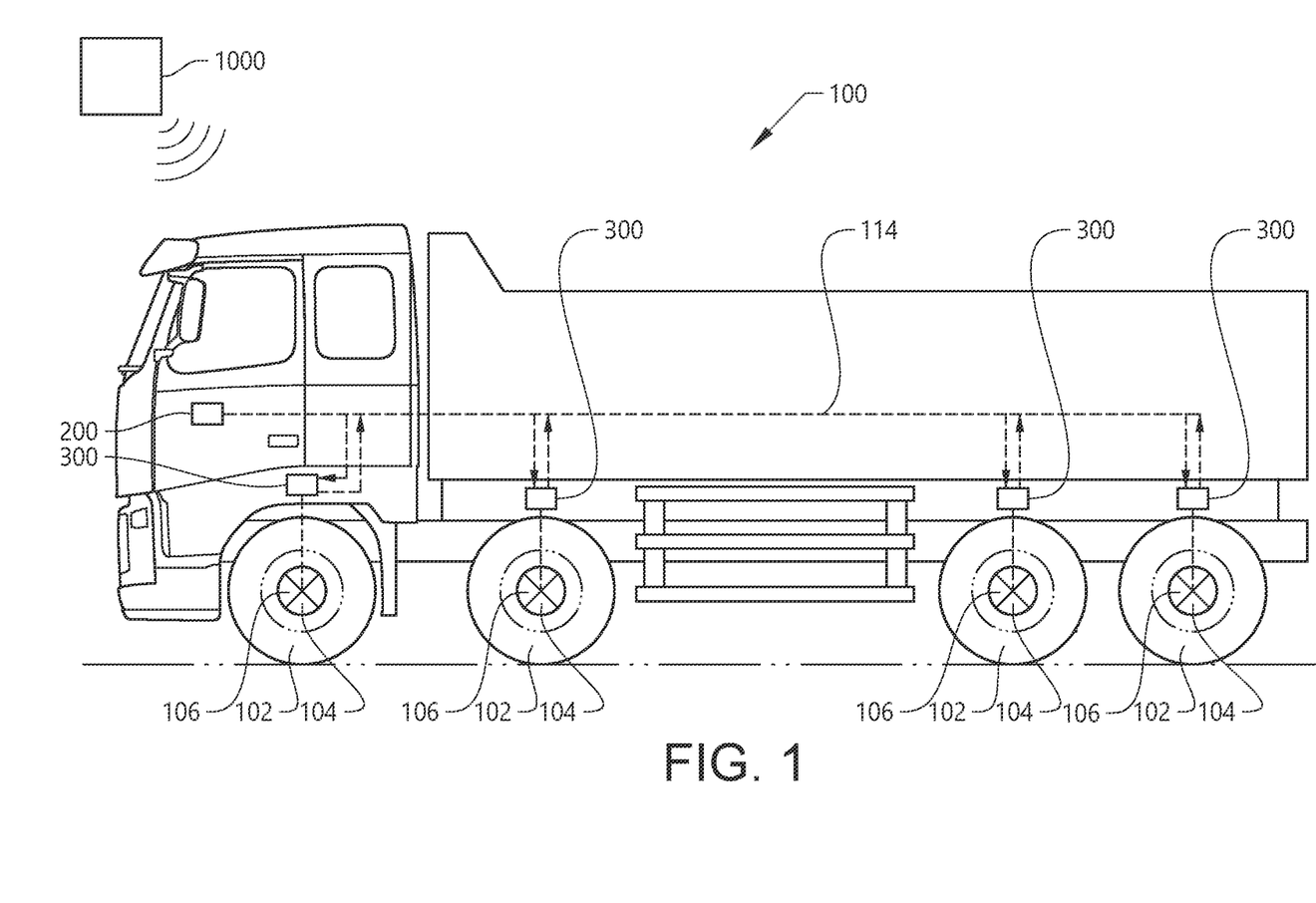
FIG. 1 is a lateral side view illustrating an example embodiment of a vehicle in the form of a truck.
Figure 3:
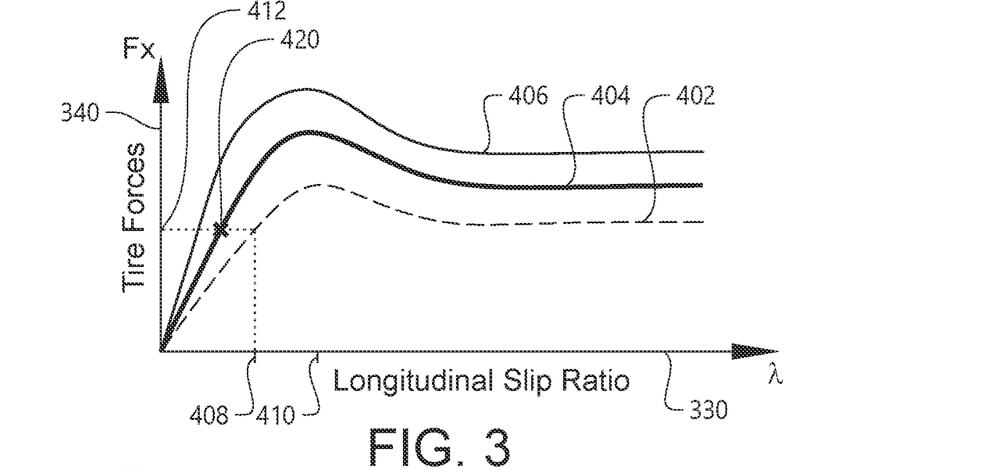
FIG. 3 is a graph illustrating an example embodiment of a model representing a relationship between wheel slip and tire forces.
Figure 4:
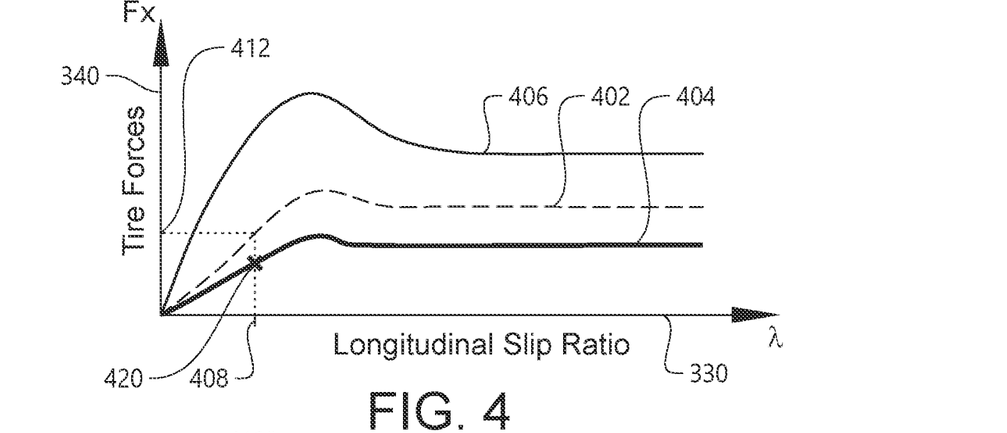
FIG. 4 is a graph illustrating a further example embodiment of a model representing a relationship between wheel slip and tire forces.
Figure 5:
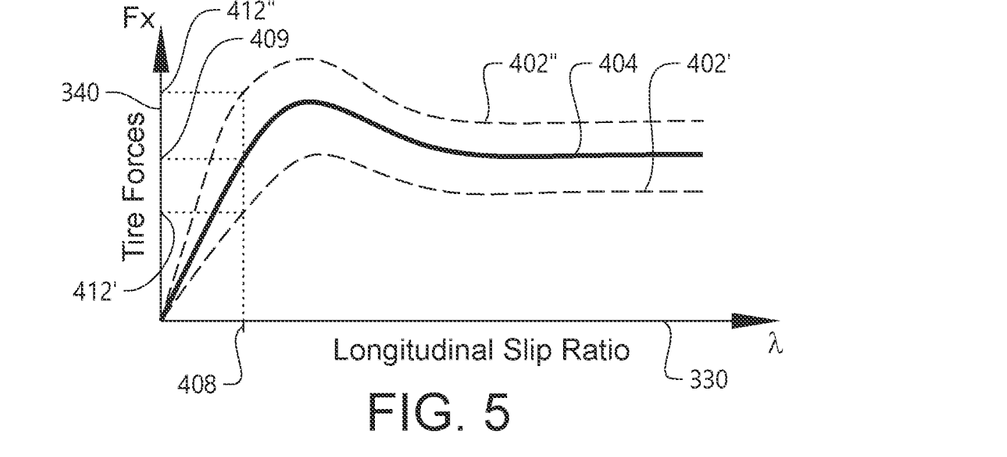
FIG. 5 is a graph illustrating a still further example embodiment of a model representing a relationship between wheel slip and tire forces.

With particular reference to FIG. 1, there is depicted a vehicle 100 in the form of a truck. The vehicle comprises a plurality of wheels 102, wherein each of the wheels 102 comprises a respective actuator 104. Although the embodiment depicted in FIG. 1 illustrates an actuator for each of the wheels 102, it should be readily understood that e.g. one pair of wheels 102 may be arranged without such an actuator 104. Further, the actuators 104 are preferably actuators for generating a torque on a respective wheel of the vehicle or for both wheels of an axle. The actuator may be a propulsion device, such as an electric machine 106 arranged to e.g. provide a longitudinal wheel force to the wheel(s) of the vehicle 100, as depicted in FIGS. 3-5 and described further below. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

Moreover, each of the actuators 104 is connected to a respective actuator control system 300 arranged for controlling operation of the actuator 104. The actuator control system 300 is preferably a decentralized motion support system 300, although centralized implementations are also possible. It is furthermore appreciated that some parts of the actuator control system may be implemented on processing circuitry remote from the vehicle, such as on a remote server 1000 accessible from the vehicle via wireless link. Still further, each actuator control system 300 is connected to a vehicle motion management system 200 of the vehicle 100 via a data bus communication arrangement 114 that can be either wired, wireless or both wired and wireless. Hereby, control signals can be transmitted between the vehicle motion management system 200 and the actuator control system 300. The vehicle motion management system 200 and the actuator control system 300 will be described in further detail below with reference to FIG. 2.

The vehicle motion management system 200 as well as the actuator control system 300 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device.

Figure 2:
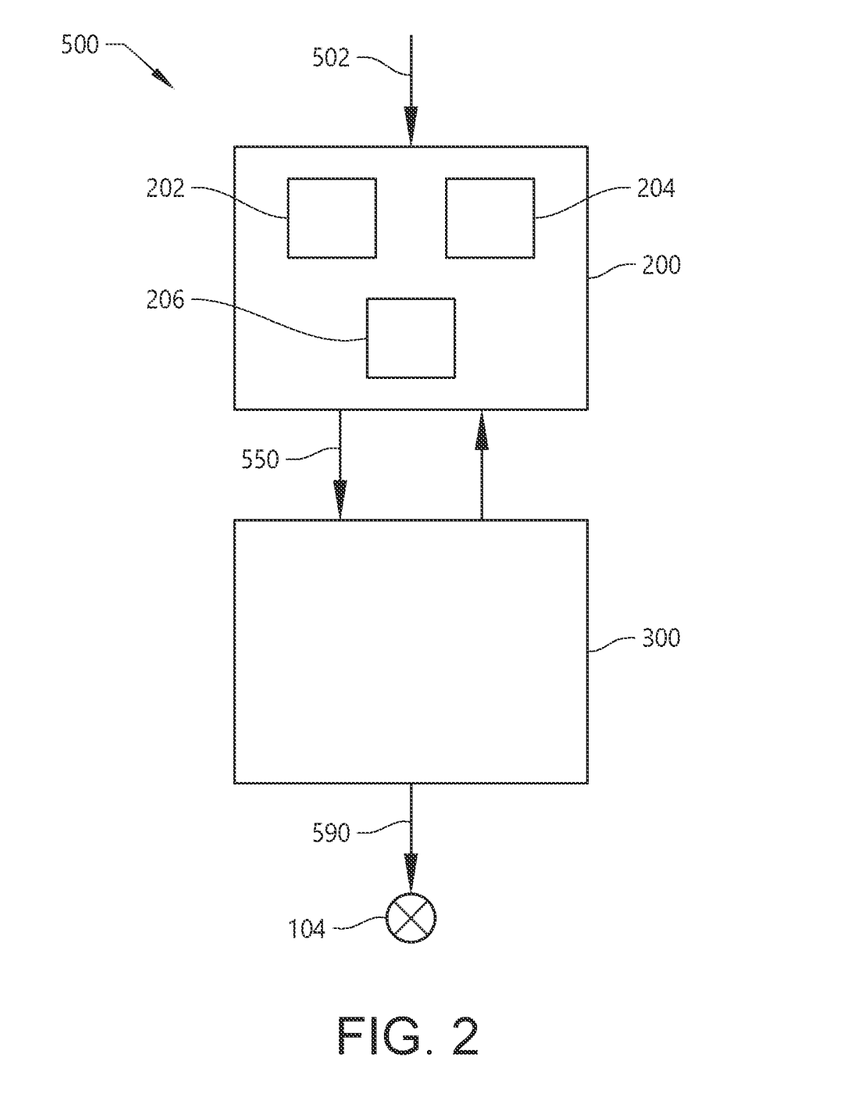
FIG. 2 is a schematic illustration of a vehicle motion management system and an actuator control system according to an example embodiment.

Turning to FIG. 2 which is a schematic illustration of the vehicle motion management system 200 and the actuator control system 300 according to an example embodiment. The vehicle motion management system 200 and the actuator control system 300 thus form part of a vehicle motion system 500.

The overall vehicle control system 500 may be implemented on one or more vehicle unit computers (VUC). The VUC may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer.

FIG. 2 schematically illustrates functionality for controlling one or more wheels by some example actuator control systems (ACSs), such as a friction brake and a propulsion device. The friction brake and the propulsion device are examples of wheel torque generating devices, which may also be referred to as actuators and which can be controlled by one or more actuator control units. The control is based on, e.g., measurement data obtained from a wheel speed sensor and from other vehicle state sensors, such as radar sensors, lidar sensors, and vision based sensors such as camera sensors and infra-red detectors. Other example torque generating motion support devices which may be controlled according to the principles discussed herein comprise engine retarders and power steering devices. An ACS control unit may be arranged to control one or more actuators. For instance, it is not uncommon that an ACS control unit is arranged to control both wheel on a given axle, e.g., via a differential.

The TSM function plans driving operation with a time horizon of, e.g., 10 seconds or so. This time frame corresponds to, e.g., the time it takes for the vehicle to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function which performs force allocation to meet the requests from the TSM in a safe and robust manner.

Acceleration profiles and curvature profiles may also be obtained from a driver of the heavy duty vehicle via normal control input devices such as a steering wheel, accelerator pedal and brake pedal.

The VMM function operates with a time horizon of about 1 second or so, and continuously transforms the acceleration profiles $a_{req}$ and curvature profiles $c_{req}$ into control commands for controlling vehicle motion functions, actuated by the different ACSs of the vehicle 100 which report back capabilities to the VMM, which in turn are used as constraints in the vehicle control. The VMM function performs vehicle state or motion estimation, i.e., the VMM function continuously determines a vehicle state comprising positions, speeds, accelerations and articulation angles of the different units in the vehicle combination by monitoring operations using various sensors arranged on the vehicle 100, often but not always in connection to the ACSs.

The result of the motion estimation, i.e., the estimated vehicle state(s), may be input to a force generation module which determines the required global forces for the different vehicle units to cause the vehicle 100 to move according to the requested acceleration and curvature profiles $a_{req}$, $c_{req}$. The required global force vector is input to an ACS coordination function which allocates wheel forces and coordinates other ACSs such as steering and suspension. The coordinated ACSs then together provide the desired lateral $F_y$ and longitudinal $F_x$ forces on the vehicle units, as well as the required moments $M_z$, to obtain the desired motion by the vehicle combination.

By determining vehicle unit motion using, e.g., global positioning systems, vision-based sensors, wheel speed sensors, radar sensors and/or lidar sensors, and translating this vehicle unit motion into a local coordinate system of a given wheel (in terms of, e.g., longitudinal and lateral velocity components), it becomes possible to accurately estimate wheel slip by comparing the vehicle unit motion in the wheel reference coordinate system to data obtained from the wheel speed sensor arranged in connection to the wheel.

A mapping model, also referred to as a tire model, which will be discussed in more detail in connection to FIGS. 3-5 below, can be used to translate between a desired longitudinal tire force $F_{xi}$ and wheel slip. Wheel slip relates to a difference between wheel rotational velocity and speed over ground and will be discussed in more detail below. Wheel speed is a rotational speed of the wheel, given in units of, e.g., rotations per minute (rpm) or angular velocity in terms radians/second (rad/s) or degrees/second (deg/s).

Herein, a tire model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tire models. See, e.g., chapter 7 where the relationship between wheel slip and longitudinal force is discussed.

To summarize, the VMM function manages both force generation and ACS coordination, i.e., it determines what forces that are required at the vehicle units in order to fulfil the requests from the TSM function, for instance to accelerate the vehicle according to a requested acceleration profile requested by TSM and/or to generate a certain curvature motion by the vehicle also requested by TSM. The forces may comprise e.g., yaw moments $M_z$, longitudinal forces $F_x$ and lateral forces $F_y$, as well as different types of torques to be applied at different wheels.

The VMM is arranged as a higher layer control system, while the ACS is arranged as a lower layer control system. The higher layer VMM 200 is thus arranged to determine various parameters, as will be described below, in the vehicle/wheel domain, i.e. based on an overall vehicle condition, such as vehicle speed. The lower layer ACS 300 on the other hand is arranged to determine parameters which are specific for the actuator connected to the wheel. The lower layer ACS thus transform the signals received from the higher layer VMM into the actuator domain taking into account e.g. gear ratio, driveline inertia, etc.

According to a non-limiting example, the vehicle motion management system 200 comprises a torque module 202, a mapping module 204 and a wheel speed module 206. The vehicle motion management system 200 is further arranged to receive vehicle operation signal(s) 502 which comprises data to be operated on the vehicle motion management system 200 and its various modules 202, 204, 206. The vehicle operation signal(s) 502 provided to the vehicle motion management system 200 may, for example, comprises data in the form of signal(s) indicative of a parameter value relating to a desired wheel force of at least one of the wheels of the vehicle, a current environment of the vehicle, a current traffic situation, vehicle weight parameter, such as e.g. if the vehicle is laden, unladen, partially laden, and/or the topology of the road at which the vehicle is presently operating, etc. The vehicle motion management system 200 may also receive other signals indicative of specific vehicle conditions, such as e.g. a current vehicle operating condition as will be described below. The torque module 202, the mapping module 204 and the wheel speed module 206 are configured to transmit communication signals between one another, i.e. the different modules are configured to communicate with each other as will be evident by the following disclosure. It should be readily understood that the torque module 202, the mapping module 204 and the wheel speed module 206 are illustrated as separate components merely for illustrative purposes. The vehicle motion management system 200 may of course also simply comprise various control functionalities itself which executes the below described functionalities.

The following will now describe the functional operation of the vehicle motion management system 200. In particular, the vehicle motion management system 200 is arranged to obtain a parameter value relating to the desired wheel force of at least one wheel 102 of the vehicle. The parameter is preferably provided as data incorporated in the above described vehicle operation signal 502, and preferably received by the torque module 202. The parameter should be construed as being either a desired wheel force and/or a desired wheel torque, which is based on a requested demand from e.g. a vehicle operator, a system for autonomously controlling the vehicle, an ADAS system, etc. In the case of requested demand from the vehicle operator, the signal may be based on an accelerator pedal position or a brake pedal position.

Based on the parameter value relating to the desired wheel force, the torque module 202 determines a torque limit for the at least one wheel 102. Various alternatives of determining the torque limit will be described in further detail below with reference to the description of FIG. 5.

Moreover, the mapping module 204 is configured to determine a mapping model (see e.g. 402 in FIGS. 3 and 4) defining a relationship between wheel forces and wheel speed of the at least one wheel 102. The wheel speed can be defined relative to the ground, and normalized, i.e. a wheel slip, or be defined as an absolute rotational velocity.

The mapping model thus defines longitudinal wheel forces for specific wheel speeds, and can be based on an estimated characteristics of the relationship between the wheel forces and the wheel speed. For example, the mapping model can be based on an assumption of a slippery road surface, where the wheel force for a specific wheel speed is lower compared to the wheel force for the same wheel speed of a dry road surface. The mapping model can also be based on a normal load exposed to the tire, the specific tire currently used, an expected wear of the tire, an estimated friction level between the tire and the road surface, etc. According to further examples, the mapping model can also be based on a predetermined characteristic value of the at least one wheel, a relationship between wheel force and wheel speed for a predetermined wheel characteristic of the at least one wheel, as well as based on a safety parameter indicative of a current operating condition of the vehicle.

Based on the mapping model determined by the mapping module 204, the wheel speed module 206 is configured to determine a parameter value relating to a desired wheel speed for the at least one wheel 102 of the vehicle 100. The parameter relating to the desired wheel speed may correspond to the desired wheel speed or to a desired wheel slip. Hence, as the desired wheel force has been obtained, the wheel speed module 206 can map this wheel force, using the mapping model, to a desired wheel speed/wheel slip.

When the torque limit and the desired wheel speed have been determined, the vehicle motion management system 200 transmits a control signal 550 comprising data indicative of the torque limit and the desired wheel speed to the actuator control system 300.

The actuator control system 300 thus receives the control signal 550 from the vehicle motion management system 200. As described above, the control signal is indicative of a torque limit and a parameter value relating to a desired wheel speed for the actuator. The actuator control system 300 thereafter transmits an actuator control signal 590 to the actuator 104 for controlling operation thereof, in particular for controlling the actuator 104 to generate an operating torque on the at least one wheel to obtain the desired wheel speed but without exceeding the torque limit.

Hereby, during operation of the vehicle 100, the actuator 104 will be operated in a torque limit control mode when driving on e.g. a dry road, as the applied torque will hit the torque limit, and when driving on a more slippery road, the actuator 104 will be operated in a wheel speed control mode as the torque limit will not be reached.

The actuator control system 300 may also be arranged to obtain a signal indicative of a current driveline state of the vehicle 100. The current driveline state can, for example, relate to a current vehicle transmission state, a gear stage for the vehicle transmission, a transmission clutch actuation state, etc. The operating torque determined by the actuator control system 300 can thus also be based on the current driveline state.

In order to present example embodiments of the present disclosure, reference is made to FIGS. 3-5 which illustrate graphs depicting various examples of the model representing the relationship between wheel slip and tire forces. In each of FIGS. 3-5, the vertical axis 340 represents the tire force generated between the surface supporting the wheel 102 and the wheel 102, while the horizontal axis 330 represents the longitudinal wheel slip of the wheel 102. It should be observed that the X-axis, i.e. the axis defining the longitudinal wheel slip should be construed as equally as well relate to the longitudinal wheel speed of the wheel, as wheel slip is a parameter value relating to the wheel speed. Furthermore, FIGS. 3-5 depicts a propulsion scenario, i.e. where the tire forces are positive. The present disclosure is of course also applicable for a scenario where the tire forces are negative, i.e. during deceleration, which would correspond to a graph mirrored in relation to the X- and Y-axis of FIGS. 3-5.

Reference is initially made to FIG. 3, which is a graph illustrating a first example embodiment of the model representing a relationship between wheel slip and tire forces. As can be seen in dashed lines, the mapping model 402 is determined based on any of the above described examples. FIG. 3 also depicts an actual tire model 404, i.e. the actual relationship between the wheel slip and tire forces, as well as an expected model 406 for a dry road surface and substantially unused tires, i.e. a very good grip between the tire and the road surface.

The mapping model 402 thus corresponds to an expected condition which is more slippery compared to the "perfect" condition of the model indicated with reference numeral 406. The torque limit is set, which is indicated by reference numeral 412. The torque limit is thus converted to a tire force limit 412. Further, a slip limit 410 is generated, whereby the wheel is not allowed to exceed this slip limit.

As can be seen in FIG. 3, the actual tire model 404 is located above the mapping model 402, i.e. the actual tire force for a specific wheel slip is in reality higher than the tire force of the generated mapping model 402. Thus, the vehicle is thus likely operated at a dry road surface and/or with no substantial steering input. The actuator 104 is controlled to generate a torque for operating the vehicle at a desired wheel speed/wheel slip 408. In the example in FIG. 3, the actuator 104 will operate at the torque limit 412 since the requested wheel slip will not be reached when driving at the relatively dry road surface. Thus, in the situation depicted in FIG. 3, the actuator 104 will be operated in the torque limit control mode. An operator of the vehicle 100 will thus receive the torque he/she requested, and the vehicle will be operated in a relatively smooth steady-state condition.

Turning to FIG. 4 which illustrates another operating scenario. As can be seen in FIG. 4, the actual tire model 404 is located below the mapping model 402, i.e. the actual tire force for a specific wheel slip is in reality lower than the tire force of the generated mapping model 402. Thus, the vehicle is likely operated at a slippery road, and/or operated with large steering input, i.e. exposed to high lateral forces. In a similar vein as described above in relation to FIG. 3, the actuator 104 is controlled to generate a torque for operating the vehicle at the desired wheel speed/wheel slip 408. However, as the actual tire model 404 is located below the generated mapping model 402, the desired wheel speed/wheel slip 408 will be reached before the actuator reaches the torque limit 412. In detail, the torque limit 412 will not be reached and the actuator 104 will be operated in a wheel speed control mode. In this case, wheel slip will be controlled in a proportional manner relative to a driver request and vehicle stability will be preserved.

The vehicle 100 may thus operate according to the example in FIG. 3, i.e. the actuator 104 is operated in the torque limit control mode, and when the vehicle thereafter suddenly drives over a strip of ice, the vehicle 100 is operated according to the example in FIG. 4, i.e. the actuator 104 is operated in the wheel speed control mode. Hence, a rapid change from the torque limit control mode to the wheel speed control mode is obtained, without any interaction from the vehicle motion management system 200.

Turning now to FIG. 5 which is a graph illustrating a still further example embodiment of a model representing a relationship between wheel slip and tire forces. In particular, FIG. 5 depicts the use of a lower 402' and an upper 402" upper mapping model. The lower mapping model 402" represents e.g. a slippery road condition, while the upper mapping model 402' represents e.g. a dry road surface. In further detail, for a specific wheel slip value, a tire force for the upper mapping model 402" is higher compared to a tire force for the lower mapping model 402'.

The actuator 104 is controlled to generate a torque for operating the vehicle 100 at a desired wheel speed/wheel slip 408 in a similar vein as described above. However, the actuator torque is not allowed to either exceed an upper torque limit 412" defined by the upper mapping model 402", or fall below a lower torque limit 412' defined by the lower mapping model 402'. A torque request 409 is the example depicted in FIG. 5 as being somewhere between the upper 412" and lower 412' limits.

The upper 412" and lower 412' torque limits are defined for a given wheel speed/wheel slip from the upper 402" and lower 402' mapping model, respectively, and can be optionally adjusted by further equations, two alternatives of such adjustments are shown in equations (1)-(2) and (3)-(4). Equations (1)-(2) are adjusting the torque limits described above, based on a predetermined margin value, i.e. a value that defines a minimum operating band needed to be able to perform wheel speed control, while equation (3)-(4) are adjusting the torque limits on a functional safety torque value, i.e. a safety value defining a maximum operating band around any given torque request, considering aspects of vehicle safety.

$$T_{min} = \min(T_{412'}, T_{req} - T_{margin}) \quad (1)$$

$$T_{max} = \max(T_{412''}, T_{req} + T_{margin}) \quad (2)$$

$$T_{min} = \max(T_{min}, T_{req} - T_{funcSafety}) \quad (3)$$

$$T_{max} = \min(T_{min}, T_{req} + T_{funcSafety}) \quad (4)$$

Where
$T_{req}$ is the requested torque; and
$T_{min}$ is a predetermined minimum torque.

Equations (1) and (2) is preferably applicable at operating conditions with low wheel slip, as $T_{min}$ and $T_{max}$ for low wheel slip will otherwise be substantially the same. Equations (3) and (4) include the operator $T_{funcSafety}$, which is a torque taking functional safety of the vehicle into account, such as e.g. vehicle speed, vehicle weight, etc.

Other alternatives of determining the upper and lower torque limits are also conceivable, such as, not necessarily taking a mapping model into account, to define the lower torque limit as the requested torque minus the torque margin, and the upper torque limit as the requested torque plus the torque margin.

Figure 6:
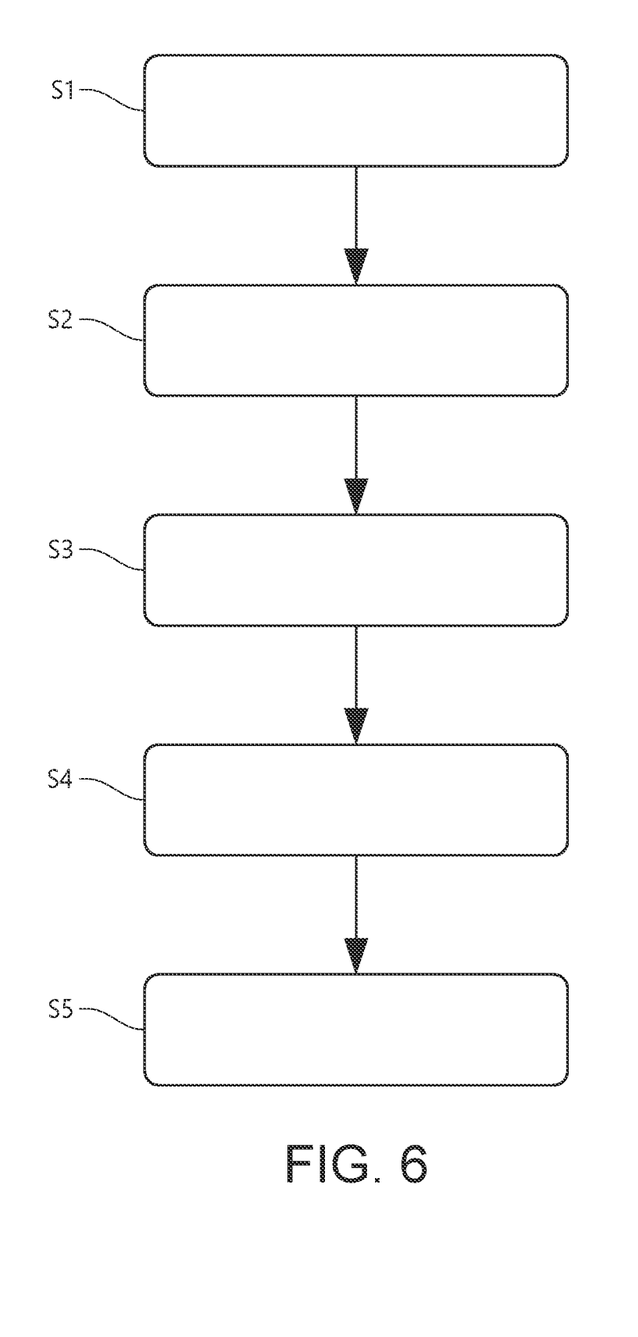
FIG. 6 is a flow chart of a method for controlling an actuator of the vehicle in FIG. 1 according to an example embodiment.

In order to sum up, reference is made to FIG. 6 which is a flow chart of a method for controlling the above described actuator 104. As described above, a parameter value relating to the desired wheel force, such as e.g. a desired wheel torque, of at least one wheel 102 of the vehicle 100 is determined S1. The desired wheel force can be determined based on a requested demand from e.g. a vehicle operator, a system for autonomously controlling the vehicle, an ADAS system, etc. Based on the desired wheel force, a torque limit 412 is determined S2.

Furthermore, a mapping model 402, as depicted in FIGS. 3-5, is determined S3 based on the relationship between the wheel forces and the wheel speed. Further, based on the mapping model 402, a parameter value relating to a desired wheel speed for the at least one wheel 102 is determined S4, whereby the actuator 104 is controlled S5 to generate an operating torque on the at least one wheel. The operating torque is subject to the determined torque limit and the desired wheel speed, i.e. the operating torque is thus not allowed to exceed the torque limit.

It is to be understood that the present disclosure is not limited to the embodiments described above and illustrated in the drawings; rather, the skilled person will recognize that many changes and modifications may be made within the scope of the appended claims.

The invention claimed is:

1. A vehicle motion management system for a vehicle, the vehicle motion management system being connectable to an actuator control system for communication of control signals therebetween, the vehicle motion management system configured to:
    obtain a parameter value relating to a desired wheel force of at least one wheel of the vehicle;
    determine a torque limit for the at least one wheel based on the parameter value relating to the desired wheel force;
    determine a mapping model based on an estimated characteristic of a relationship between wheel force and wheel speed of the at least one wheel;
    determine a parameter value relating to a desired wheel speed for the at least one wheel based on the mapping model; and
    transmit a control signal to the actuator control system, the control signal being arranged to, when executed by the actuator control system, cause the actuator control system to generate an operating torque to be executed subject to the torque limit and the desired wheel speed.

2. The vehicle motion management system of claim 1, wherein the mapping model is based on a predetermined characteristic value of the at least one wheel.

3. The vehicle motion management system of claim 1, wherein the mapping model is based on a relationship between wheel force and wheel speed for a predetermined wheel characteristic of the at least one wheel.

4. The vehicle motion management system of claim 1, wherein the mapping model is based on a safety parameter indicative of a current operating condition of the vehicle.

5. The vehicle motion management system of claim 1, wherein the parameter value relating to the desired wheel speed is a desired wheel slip parameter.

6. The vehicle motion management system of claim 1, wherein the torque limit is determined independently from the determined mapping model.

7. The vehicle motion management system of claim 1, wherein the mapping model is a first mapping model, the vehicle motion management system being configured to:
determine a second mapping model, the second mapping model based on an increased wheel force compared to the first mapping model for respective wheel speeds.

8. The vehicle motion management system of claim 7, wherein the torque limit is a first torque limit, the vehicle motion management system being configured to:
determine a second torque limit relating to a desired wheel speed based on the second mapping model;
wherein the transmitted control signal is arranged to, when executed by the actuator control system, cause the actuator control system to generate the operating torque to be executed subject to the desired wheel speed and the first and second torque limits.

9. The vehicle motion management system of claim 7, wherein the first and second mapping models are determined based on a predetermined range between wheel force values for a specific wheel speed.

10. An actuator control system for a vehicle, the actuator control system being connectable to the vehicle motion management system of claim 1 and to at least one actuator configured to apply a torque on at least one wheel of the vehicle, the actuator control system configured to:
receive a control signal from the vehicle motion management system, the control signal being indicative of a torque limit and a parameter value relating to a desired wheel speed for the actuator; and
transmit an actuator signal to the actuator for the actuator to generate an operating torque on the at least one wheel subject to the torque limit and the parameter value relating to the desired wheel speed.

11. The actuator control system of claim 10, wherein the actuator signal is configured to control the actuator to generate an operating torque without exceeding the torque limit.

12. The actuator control system of claim 10, wherein the actuator control system is configured to generate the operating torque based on a current vehicle driveline state for the vehicle.

13. The actuator control system of claim 10, wherein the actuator control system is a decentralized actuator control system connectable to a wheel specific actuator configured to control a single wheel of the vehicle.

14. A method for controlling an actuator of a vehicle, comprising:
determining a parameter value relating to a desired wheel force of at least one wheel of the vehicle;
determining a torque limit for the at least one wheel based on the parameter value relating to the desired wheel force;
determining a mapping model based on an estimated characteristic of a relationship between wheel force and wheel speed of the at least one wheel;
determine a parameter value relating to a desired wheel speed for the at least one wheel based on the mapping model; and
controlling an actuator to generate an operating torque on the at least one wheel subject to the torque limit and the parameter value relating to the desired wheel speed.

* * * * *